W. ROSE.
APPARATUS FOR MAKING BAGS OR CONTAINERS.
APPLICATION FILED MAY 5, 1914.
1,159,276.
Patented Nov. 2, 1915.
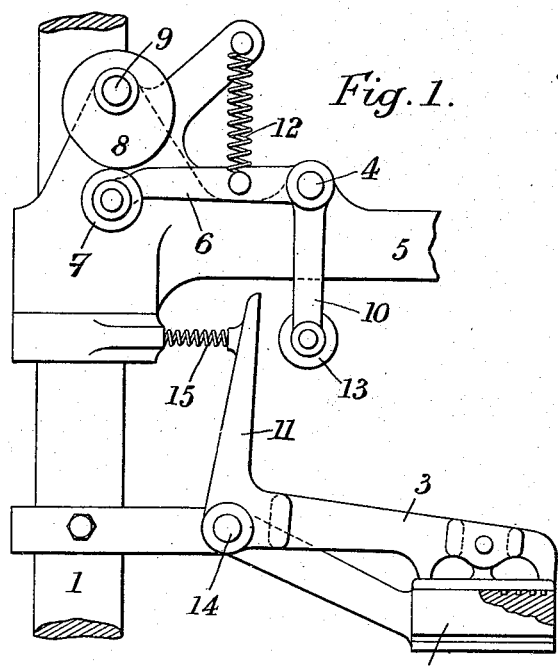
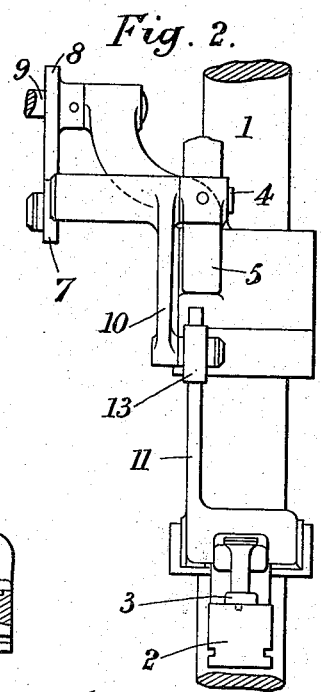
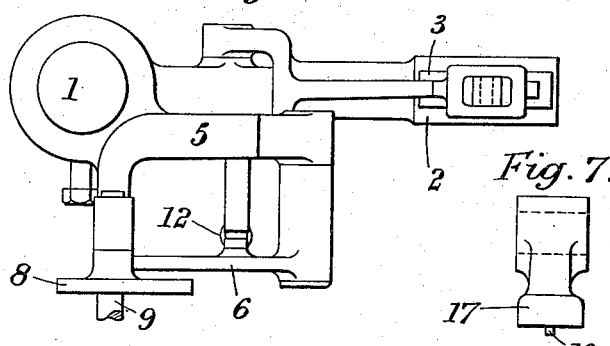
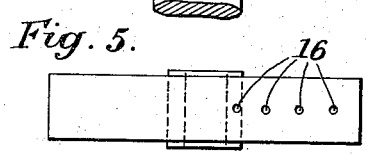
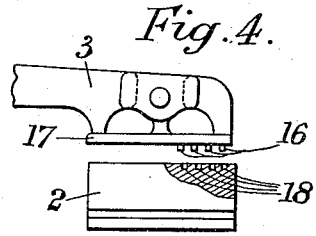
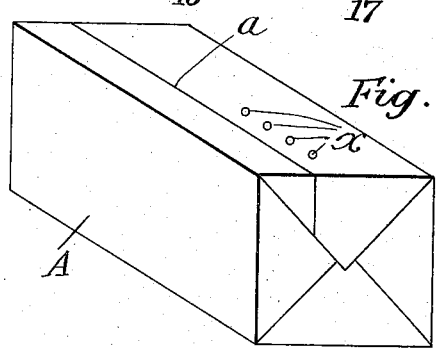
WITNESSES
L. H. Grote
M. E. Keir
INVENTOR
WILLIAM ROSE
BY Johnson and Johnson
Attorneys

UNITED STATES PATENT OFFICE.

WILLIAM ROSE, OF GAINSBOROUGH, ENGLAND.

APPARATUS FOR MAKING BAGS OR CONTAINERS.

1,159,276.  Specification of Letters Patent.  Patented Nov. 2, 1915.

Application filed May 5, 1914. Serial No. 836,508.

*To all whom it may concern:*

Be it known that I, WILLIAM ROSE, a subject of the King of Great Britain, residing at Albion Works, Gainsborough, England, have invented new and useful Improvements in or Relating to Apparatus for Making Bags or Containers, of which the following is a specification.

This invention relates to apparatus for making bags, or containers, the said apparatus being of the kind in which mandrels, or "formers," (hereinafter referred to as "formers") are employed upon which the bags, or containers, are made, the said bags, or containers, being afterward delivered to a series of devices, such for instance as weighing, or measuring and filling, devices, or to a number of operators who weigh, or measure and fill, or otherwise deal with the said bags, or containers.

In apparatus of the kind referred to it has hitherto been difficult to identify which device, or which operator weighed, or measured, the contents for, and filled, a particular bag, or container, and this invention has for its object to provide the apparatus with means whereby each bag, or container, of a series of bags, or containers, can be stamped, or embossed, or otherwise marked, with a distinctive marking to distinguish it from the bags, or containers, of another series so that, after the said bags, or containers, have been fed, or supplied, to a number of operators, or to a series of measuring, or weighing, or filling devices, or the like, and have been dealt with thereby, it can, at any time, be ascertained by which operator, or by which of a series of measuring, or weighing, or filling, devices, or the like, any particular bag, or container, was dealt with.

According to this invention I employ a suitable number of distinguishing marks, or characters, which may be carried by suitable levers, or bars, operated by any suitable mechanism so as to cause the said marks, or characters, to mark the paper, cardboard, or other material, of which the bags, or containers, are made, while the said bags, or containers, are on the "former." I prefer to use a number of distinguishing marks, or characters, recurring in consecutive order, and it is also preferred that the number of different marks, or characters, shall correspond to the number of operators, or measuring, weighing, or filling, devices employed. For example, presuming the apparatus to be of the intermittent rotary kind and provided with eight "formers" and that four operators are employed for charging the said bags, or containers, two sets, or series, of distinguishing marks, or characters, can be employed for instance, two sets of the letters A. B. C. and D, so that the bags, or containers, made on the first and fifth "formers" will be marked with the letter "A," those made on the second and sixth "formers" will be marked with the letter "B," those made on the third and seventh "formers" will be marked with the letter "C" and those made on the fourth and eighth "formers" will be marked with the letter "D." The marked bags, or containers are then delivered, by any suitable means, (such for example as a traveling belt, or traveling belts) to the four operators, the bags, or containers, marked "A" passing to the first operator, those marked "B" passing to the second operator, those marked "C" to the third operator, and those marked "D" to the fourth operator. In the apparatus wherein a lever, or bar, is employed to press upon the longitudinal seams of the bags, or containers, while on the "formers," the said mark, or marks, or character, or characters, is, or are, preferably carried by the said levers, or bars, or I may employ other suitable levers, or pressers, to apply the said mark, or character, or marks, or characters, to the said bags, or containers, in any desired position.

Instead of employing letters as identification marks I may employ numerals, a number of dots, or dashes, or any other sufficiently distinctive marks, or characters.

The accompanying drawings illustrate the preferred means for carrying this invention into practical effect, Figures 1, 2, and 3 showing in views at right angles to each other so much of an apparatus for making bags, or containers, as is necessary to show the application of this invention thereto; Fig. 4 is a detail showing the indicating means in its operative position; Figs. 5, 6 and 7 show, in views at right angles to each other, the indicating means separate from the apparatus and Fig. 8 shows, in perspective, a completely folded packet with marks of identification thereon.

Referring to Figs. 1, 2 and 3 the apparatus for making the bags, or containers, is shown as comprising an intermittently rotating vertical shaft 1 having mounted thereon a number of "formers" of which only one (marked 2) is shown in the said figures, each being provided with a presser-foot, or bar 3, and means for operating it whereby the said presser-foot, or bar, is caused at the proper times, to descend and hold the longitudinal seam a of the bag, or container A, onto the "former" 2, but this invention may be applied to any other kind of bag, or container, making apparatus, to which it is applicable. The means shown in the drawings for operating the presser-foot, or bar, 3, consists of a bell-crank lever pivoted at 4, to a stationary bracket 5 one arm 6 of which lever is actuated through an anti-friction roller 7, by a cam 8, on a rotating shaft 9. The larger part of the cam 8 acts to depress the arm 6 of the said bell-crank lever which causes its other arm 10 to be moved free of an upwardly projecting arm 11 on the presser-foot, or bar, 3, and the smaller part of the said cam permits the arm 6, to be raised by the action of a spring 12, so that the said arm 10 is brought into engagement, through an anti-friction roller 13, with the projecting arm 11 on the presser-foot, or bar, 3 and turns the said presser-foot, or bar, on its pivot 14 in opposition to the action of a spring 15.

The means for marking the bags, or containers, in the example shown in the accompanying drawings, consists of a projection, or projections, 16, formed on the underside of a piece 17 hinged to the presser-foot, or bar, 3 which projections enter a groove, or recesses, 18, formed in the upper side of the "former" 2. Four projections 16 are shown in Figs. 1, 4, 5, and 6 but the number of such projections will be varied according to requirements, for instance, in the example of apparatus before referred to having, it is presumed, eight "formers" and the bags, or containers, made thereon delivered to four operators, the first and fifth "formers" will each be provided with but one projection, the second and sixth "former" will each be provided with two projections, the third and seventh "former" will each be provided with three projections and the fourth and eighth "formers" will each be provided with four projections. The presser-foot, or bar, 3 is held, by the arm 10 of the bell-crank lever, in its raised position while the material of which the bag, or container, is made is folded around the longitudinal sides of the "former" 2, the said bell-crank lever then releases the said presser-foot, or bar, which, by the action of the spring 15, then descends and causes the projections 16 to indent, or otherwise mark, the said material as at x (Fig. 8).

This invention is not limited to the precise details hereinbefore described and shown in the accompanying drawings, as it is obvious that modifications may be made without departing from the nature of the invention, for instance, each sequence of marks, or characters, may contain a blank, so that the "formers" identified by this blank would not be provided with a marking device, and the bags, or containers, made thereon would be identified by the absence of any mark, or character; and again, instead of the marks, or characters, being carried by the presser-foot, or bar, or other lever, they may be carried by the "formers" and the grooves or recesses, be formed in the said presser-foot, or bar, or other lever. Bag, or container making apparatus provided with means for marking the said bags, or containers with a series of identification marks, or characters, as hereinbefore described and for delivering the bags, or containers, having the same identification marks, or characters, to the same operator, or to the same measuring, filling, or weighing, or other device, identified with such marks or characters, provides ready means of ascertaining whether, or not, any operator, or any measuring, filling, weighing, or other device, has been performing his, or her, or its, duty satisfactorily.

What I claim is:—

1. In apparatus of the character described, a series of intermittently actuated formers adapted to act each upon a separate container, and a series of different identification marking devices one for each former, and serving to mark the container operated upon thereby with its peculiar mark, for the purpose described.

2. In apparatus of the character described, a series of formers adapted to act each upon a separate container, a common support for said formers adapted to bring each former successively into operating position, means to actuate the formers when in operating position, and an independent marking device for each former whereby the containers from each former bear an identification mark peculiar to said former.

In testimony whereof I have signed my name to this specification in the presence of two subscribing witnesses.

WILLIAM ROSE.

Witnesses:
GILBERT F. TYSON,
EDWD. GEO. DAVIES.